United States Patent
Bansal et al.

(10) Patent No.: US 9,235,004 B2
(45) Date of Patent: Jan. 12, 2016

(54) METHOD AND APPARATUS FOR CLEAVING AND CHAMFERING OPTICAL FIBER

(71) Applicant: AFL Telecommunications LLC, Duncan, SC (US)

(72) Inventors: Lalitkumar Bansal, Greenville, SC (US); John Sugrim, Inman, SC (US); Daiichiro Tanaka, Greer, SC (US)

(73) Assignee: AFL Telecommunications LLC, Duncan, SC (US)

( * ) Notice: Subject to any disclaimer, the term of this patent is extended or adjusted under 35 U.S.C. 154(b) by 272 days.

(21) Appl. No.: 13/746,721

(22) Filed: Jan. 22, 2013

(65) Prior Publication Data

US 2013/0319052 A1 Dec. 5, 2013

Related U.S. Application Data

(63) Continuation of application No. 13/482,758, filed on May 29, 2012, now abandoned, which is a continuation of application No. 13/263,636, filed as application No. PCT/US2010/030201 on Apr. 7, 2010, now abandoned.

(60) Provisional application No. 61/167,346, filed on Apr. 7, 2009.

(51) Int. Cl.
*G02B 6/25* (2006.01)
*G02B 6/245* (2006.01)

(52) U.S. Cl.
CPC ............... *G02B 6/25* (2013.01); *Y10T 225/12* (2015.04); *Y10T 225/321* (2015.04)

(58) Field of Classification Search
None
See application file for complete search history.

(56) References Cited

U.S. PATENT DOCUMENTS

| | | | | | |
|---|---|---|---|---|---|
| 4,170,726 | A | * | 10/1979 | Okuda | 219/121.69 |
| 4,345,930 | A | * | 8/1982 | Basola et al. | 65/102 |
| 4,445,632 | A | * | 5/1984 | Margolin et al. | 225/2 |
| 4,666,234 | A | * | 5/1987 | Emkey | 385/96 |
| 4,710,605 | A | * | 12/1987 | Presby | 219/121.69 |
| 4,932,989 | A | * | 6/1990 | Presby | 65/387 |
| 4,954,152 | A | | 9/1990 | Hsu et al. | |
| 5,551,968 | A | * | 9/1996 | Pan | 65/387 |
| 5,714,196 | A | * | 2/1998 | Vacha | 427/154 |
| 5,772,720 | A | | 6/1998 | Taira-Griffin et al. | |
| 5,954,974 | A | * | 9/1999 | Broer et al. | 216/2 |
| 6,139,196 | A | * | 10/2000 | Feth et al. | 385/97 |
| 6,534,741 | B2 | * | 3/2003 | Presby | 219/121.69 |
| 6,774,341 | B2 | * | 8/2004 | Ohta | 219/121.72 |
| 6,886,998 | B2 | * | 5/2005 | Kasuu et al. | 385/96 |
| 7,870,811 | B2 | * | 1/2011 | Pracklein et al. | 81/9.4 |
| 8,052,836 | B2 | * | 11/2011 | Cale et al. | 156/712 |

(Continued)

OTHER PUBLICATIONS

"Gaussian Beam Optics," Jan. 2, 2007. http://www.rpgroup.caltech.edu/courses/aph162/2007/Protocols/Optics/e3872_Gaussian-Beam-Optics.pdf.*

*Primary Examiner* — Rhonda Peace
(74) *Attorney, Agent, or Firm* — Sughrue Mion, PLLC

(57) ABSTRACT

A process and apparatus for cleaving an optical fiber are provided. The process includes window stripping the optical fiber using a laser source to create a window strip. The window stripped optical fiber is then scribed at a position within the window strip and tension is applied to the optical fiber. The cleaved optical fiber can be chamfered by applying a heat source to the cleaved end face. The above process and apparatus provide a high precision and inexpensive system for fiber cleaving and chamfering.

16 Claims, 8 Drawing Sheets

(56) References Cited

U.S. PATENT DOCUMENTS

| | | |
|---|---|---|
| 8,069,691 B2 * | 12/2011 | Murgatroyd ............... 65/433 |
| 8,378,258 B2 * | 2/2013 | Sercel et al. ............ 219/121.69 |
| 8,552,338 B2 * | 10/2013 | Sercel et al. ............ 219/121.69 |
| 8,755,654 B1 * | 6/2014 | Danley et al. ............... 385/43 |
| 2002/0031300 A1 * | 3/2002 | Jie et al. ............... 385/33 |
| 2004/0079390 A1 * | 4/2004 | Wiley ............... 134/19 |
| 2004/0120678 A1 * | 6/2004 | Hwang et al. ............... 385/134 |
| 2005/0094945 A1 | 5/2005 | Danley et al. |
| 2007/0284767 A1 | 12/2007 | Kashyap |
| 2013/0319052 A1 * | 12/2013 | Bansal et al. ............... 65/391 |
| 2014/0332510 A1 * | 11/2014 | Danley et al. ............ 219/121.69 |

\* cited by examiner

METHOD AND APPARATUS FOR CLEAVING AND CHAMFERING OPTICAL FIBER

This is a continuation of application Ser. No. 13/482,758, filed May 29, 2012, which is a continuation of application Ser. No. 13/263,636, filed Oct. 7, 2011, which priority is claimed from U.S. Provisional Patent Application No. 61/167,346, filed Apr. 7, 2009 the contents of which are incorporated herein by reference.

The present invention relates generally to optical fibers. More specifically, the present invention relates to optical fiber cleaving and chamfering.

BACKGROUND

A perfectly cleaved fiber end face is an important requirement of the optical fiber industry. There are several techniques employed in cleaving optical fibers. Cleaving an optical fiber refers to creating a mirror flat surface on the face of the optical fiber for efficient light coupling into the fiber. Conventionally, cleaving is performed using a diamond blade to make a small crack on the surface of the optical fiber and then applying tension to the optical fiber to make this crack propagate.

Mechanical cleavers are known in the art and are very economical. A more expensive laser cleaver is also known in the art. As for most processes that require cleaving, the number of cleaves required is very high and there is a need for an economical method which could potentially drive down the cost per cleave. Although mechanical cleavers are more economical, they are limited by the quality of the cleave, i.e., there is the presence of an initial crack in large diameter fibers and the fiber surface is not perfectly flat. Furthermore, the mechanical cleavers cannot shape the fiber endface as desired by the customer, such as fiber end face chamfering. A chamfered optical fiber is useful such as when optical fibers are used in the biomedical industry. In the biomedical industry, optical fibers are often inserted into small capillary tubing which could be a small diameter capillary in a DNA/RNA cassette or a small diameter catheter. These are only some uses of chamfered optical fibers and many other uses are well known and will be apparent to one skilled in the art.

Fiber end face cleaving can also be accomplished with precision using a laser cleaver, but it potentially drives-up the cost per cleave. Also, using a laser cleaver may result in fiber damage due to damage to the coating. Furthermore, in the conventional technology, a single fiber or a bundle of fibers need to be polished (after cleaving) and then chamfered. This polishing leaves behind undesirable end face debris.

SUMMARY

Exemplary embodiments of the present disclosure relate to the use of a mechanical cleaver and a laser source to cleave and chamfer the surface of an optical fiber. The system disclosed herein is inexpensive in comparison to conventional laser cleavers and addresses many of the problems of the conventional technology. Also, the present disclosure is not required to overcome the disadvantages of the conventional technology described above, and an exemplary embodiment of the present invention may not overcome any of the disadvantages of the conventional technology.

According to an exemplary embodiment a process of cleaving an optical fiber is provided. The process includes window stripping the optical fiber using a laser source to create a window strip; scribing the window stripped optical fiber at a position within the window strip; and applying tension to the optical fiber.

According to another exemplary embodiment, a process for chamfering an optical fiber is provided. According to yet another exemplary embodiment, an apparatus for cleaving and chamfering an optical fiber is provided.

BRIEF DESCRIPTION OF THE DRAWINGS

Certain aspects of the present disclosure will become more apparent by describing in detail illustrative, non-limiting embodiments thereof with reference to the accompanying drawings, in which like reference numerals refer to like elements in the drawings.

DETAILED DESCRIPTION

Figure 1:
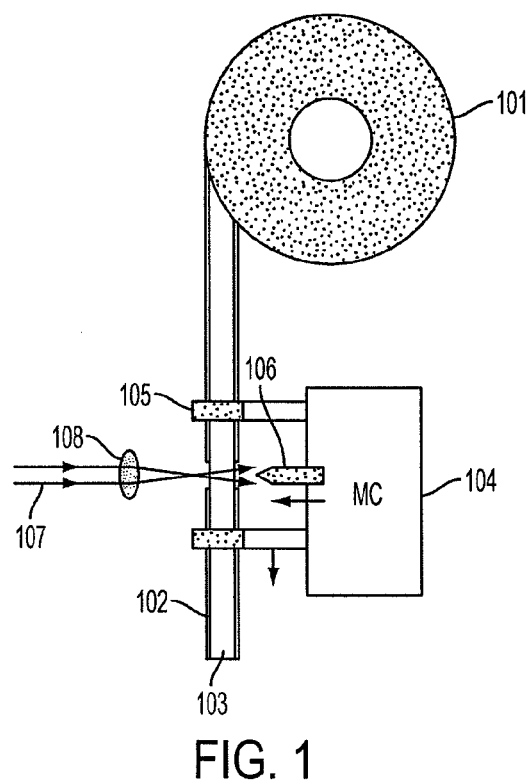
FIG. 1 illustrates an exemplary embodiment including a laser source and a mechanical cleaver.

Exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts may be omitted for clarity, and like reference numerals refer to like elements throughout.

FIG. 1 illustrates an exemplary embodiment of the present invention using a combination of a mechanical cleaver 104 and a laser beam 107 output from a suitable laser source such as a $CO_2$ laser source. An optical fiber 103 with a polymer coating 102 is obtained from a reel 101 and is held between holders 105. The polymer coating 102 could be made from various materials such as polyimide and acrylate. The lens 108 focuses the laser bream 107 and the optical fiber 103 is placed away from the focal point of the lens 107. FIG. 1 shows that a part of the coating 102 is removed due to laser ablation. Furthermore, the optical fiber 103 is held under tension by the mechanical cleaver 104 and a diamond blade 106 scribes the optical fiber 103 in an area (window strip) where the coating has been removed. Preferably, the diamond blade scribes the centre of the window strip. Scribing refers to the act of creating an initial crack, the blade needs to be touched until a crack that is sufficient in size is created so that it can propagate. The diamond blade is only an example and the set up of FIG. 1 can use any suitable scribing element. Once the diamond blade touches the window strip, i.e., makes the initial cleave, the cleave propagates through and the fiber is cleaved. The cleave may be made at an angle that is defined with respect to a normal to the optical fiber surface. Also, any angle from −0.5 to +0.5 degrees considered a low cleave angle and the cleave angle may be from −10 to +10 degrees.

In an exemplary embodiment, the mechanical cleaver 104 may also be replaced with a laser cleaver. Furthermore, the mechanical cleaver 104 may a commercially available NYFORS Auto cleaver or NYFORS LDF Auto Cleaver.

Figure 2:
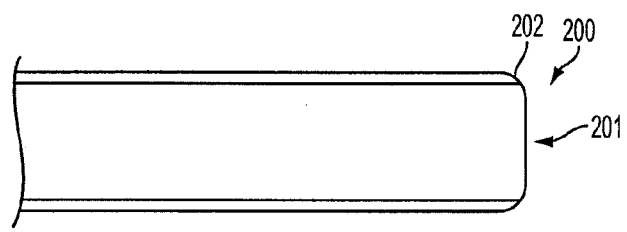
FIG. 2 illustrates a chamfered optical fiber whose end face has been chamfered.

FIG. 2 illustrates a chamfered fiber 200 whose end face 201 has been chamfered (rounded) following the cleaving by the set up in FIG. 1. The chamfered fiber edge 202 with respect to which the chamfer diameter is described is also shown in FIG. 2.

Figure 3A:
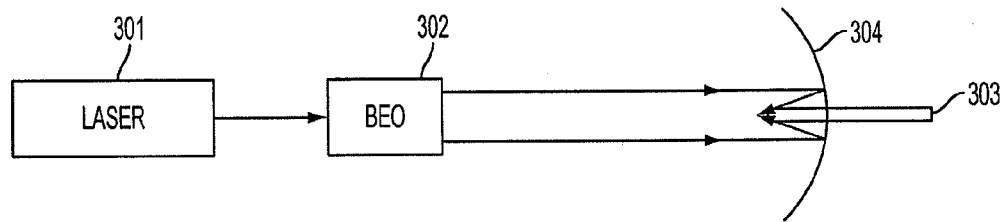
FIGS. 3A, 3B, 3C illustrate exemplary optical assemblies for chamfering an optical fiber.
Figure 3B:
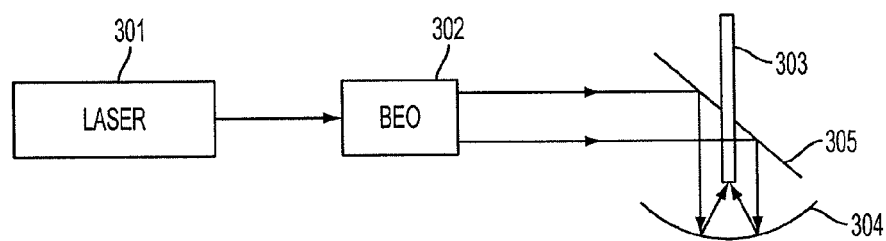
Figure 3C:
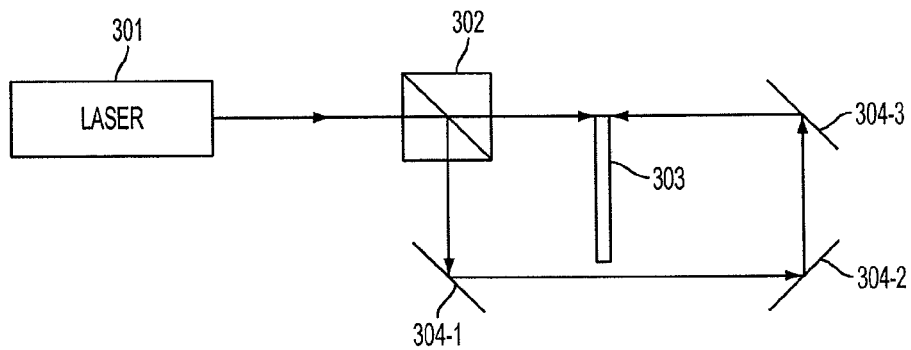

Next, FIGS. 3A-3C illustrate exemplary setups for chamfering a cleaved optical fiber 303. In a first exemplary setup illustrated in FIG. 3A, a laser source 301 is expanded using a beam expander or appropriate beam expander optics 302. A parabolic mirror 304 focuses the expanded laser beam to the end face of the cleaved optical fiber 303. The parabolic mirror has a central aperture to accommodate the optical fiber 303. The laser beam acts as a heat source to the cleaved fiber end face, which is heated to the melting point of glass (because the optical fiber is composed of glass) to erase the initial crack, erase any minor cleave abnormality, flatten the cleaved surface and chamfer the fiber end face using the surface tension effect of glass. It will be understood that the laser source 301 may be the same laser source that is used for window stripping the optical fiber in FIG. 1 or may be a different laser source. Furthermore, the expanded laser beam may be pulsed such that multiple pulses are applied to the cleaved end face of the optical fiber or a single long pulse may be applied to chamfer the fiber end face. It will be apparent to one skilled in the art that the laser source used in the above exemplary embodiments to chamfer the fiber end face may be a $CO_2$ laser or any high energy laser. Furthermore, instead of a laser source, a plasma arc, a gas flame, and a resistive coil may be used as the heat source to chamfer the fiber end face. Several other suitable heat sources will be apparent to one of ordinary skill in the art.

FIGS. 3B-3C illustrate alternative exemplary embodiments in which the fiber end face is chamfered using a laser source. In FIG. 3B, a mirror 305 which has an aperture to hold the cleaved optical fiber 303, deflects an expanded laser beam to the parabolic mirror 304. The parabolic mirror 304 then focuses the laser beam onto the end face of the cleaved optical fiber 303. In FIG. 3C, a beam splitter 302 is used to split the laser beam from the laser source 301. One part of the split beam is reflected and re-reflected by appropriately positioned mirrors 304-1, 304-2, and 304-2. By this arrangement, most if not all energy of the initial laser beam output by the source 301 is focused on the end face of the optical fiber 303. The above optical arrangements are only for purposes of illustration and several other arrangements will be apparent to one of ordinary skill in the art.

Next, a novel window stripping method using laser ablation to remove portion of a polymer coating covering the optical fiber. The window stripping method disclosed herein is inexpensive and provides superior results as compared to conventionally available window strippers because the smallest window strip that can be achieved is of the order of milli-meters. However, using the novel window stripping method disclosed herein, window strip lengths which are an order of magnitude smaller as compared to the window strip lengths of conventional devices, can be achieved.

Figure 4A:
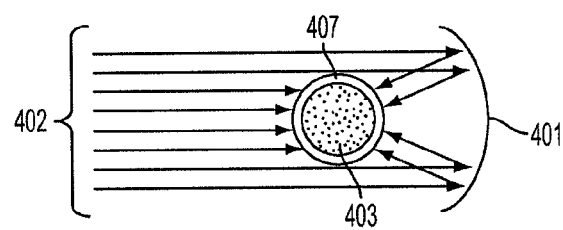
FIGS. 4A, 4B, 4C illustrate exemplary apparatus for window stripping an optical fiber.
Figure 4B:
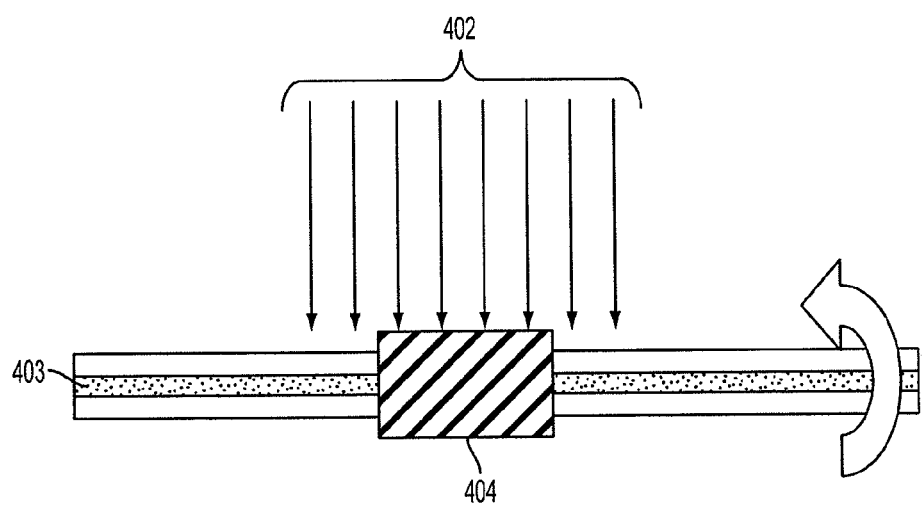
Figure 4C:
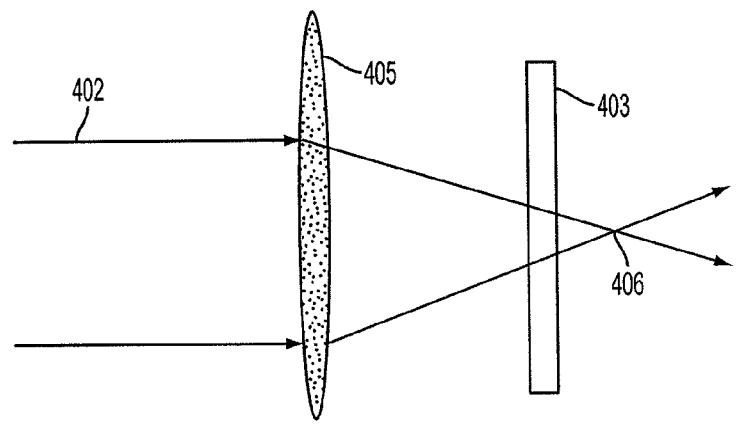

The exemplary window stripping method discussed with respects to FIGS. 4A-4C was introduced earlier with respect to FIG. 1. FIG. 4A is an exemplary embodiment of the novel window stripping method in which laser beam 402 is focused on an optical fiber 403 using a parabolic mirror 401 prior to cleaving. The window strip length is not apparent from FIG. 4A because FIG. 4A is a cross-sectional view. Laser ablation of the polymer coating 407 results in a window strip (shown later). FIG. 4B illustrates an alternative exemplary embodiment in which window stripping is achieved by coating a radiation absorbing dye 404 on an area of the optical fiber 403 from where the coating has to be removed. The radiation absorbing dye 404 is then exposed to specific radiation of a wavelength specific to the radiation absorbing dye 404, for example from a laser, thereby selectively ablating the optical fiber coating. FIG. 4C illustrates another exemplary embodiment in which a laser beam 402 is focused using a lens such as aspheric ZnSe 1.1" (dia)×1.5" (focal length). The optical fiber to be window stripped is placed at some distance from the focal point 406 of the lens 405. The optical fiber may be placed to the left or to the right of the lens 405.

Figure 5:
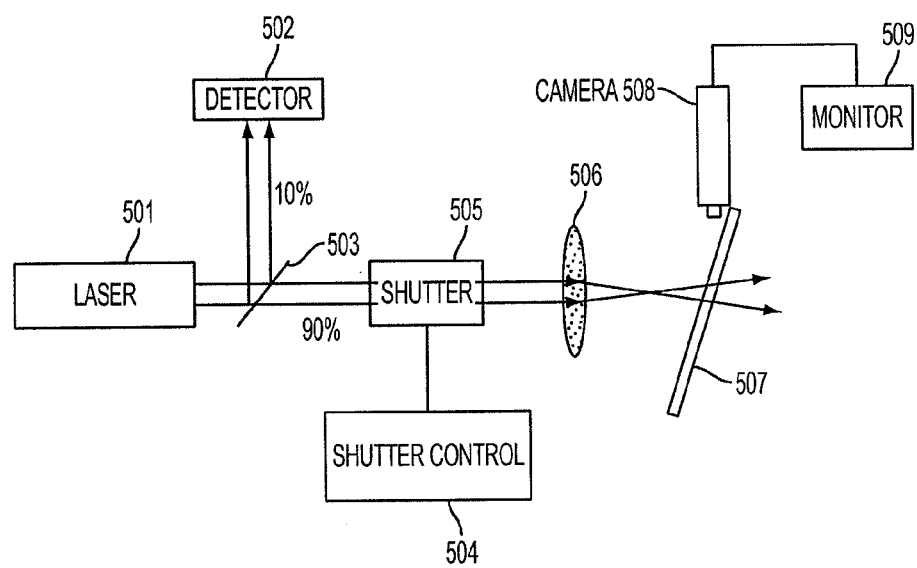
FIG. 5 illustrates another exemplary apparatus for window stripping an optical fiber.

FIG. 5 is a specific exemplary embodiment of a system based on FIG. 4C which is used to window strip the optical fiber using laser ablation. In FIG. 5, a laser source 501 outputs a laser beam which is split by a beam splitter 503 into two beams; one goes to a detector 502 and other is transmitted towards the lens 506. The detector 502 detects the power of the laser beam output from the laser source 501. For example, if the beam splitter is configured to transmit 10% to the beam splitter 502, the power emitted by the laser source 501 is ten times the power detected by the detector 502. For the system of FIG. 5, any conventional power detector which is tuned to the wavelength of the laser source 501 can be used.

FIG. 5 also includes a shutter control device 504 which controls a shutter 503. The shutter 503 is used to block the laser beam transmitted by the beam splitter 503. The shutter control device 504 and the shutter 503 may be formed integrally or may be separate devices. The shutter control is added to control the amount of laser exposure time for the optical fiber without having to use a fancy laser source. A simple continuous wave laser source can be used and the shutter operated to specify the laser exposure time (corresponding pulse width of the laser beam impinging on the optical fiber). Once the laser beam is transmitted through the shutter, it is focused by a lens 506. The optical fiber 507 is placed away from the focal point of the lens 506. The optical fiber 507 appears to be tilted in FIG. 5. However, the embodiment would work perfectly fine even if the optical fiber 507 is oriented parallel to the lens 506. A camera 508 and monitor 509 may be additionally provided for monitoring the progress of the window stripping process or for taking images of the window strip created by the above set up.

The window strip length can be controlled by varying the pulse width of the laser beam that impinges on the optical fiber and by varying the distance from the focal point. It is preferable that a pulse width of the laser beam (power 2.5 Watts) which impinges on the substrate is between 100 ms and 250 ms. Furthermore, it is preferable that the power of the laser source is less than 5 Watts to ensure a high proof strength for the optical fiber post window stripping. High laser power such as greater than 5 Watts may not be desirable as it may significantly degrade the fiber strength. However, a higher power may be permissible in a case where the fiber proof strength is not important. Several different combinations of laser pulse width and laser power will be apparent to one of ordinary skill in the art for achieving different window strip lengths of the optical fiber. According to an exemplary embodiment, the optical fiber may also be rotated in the presence of the laser beam to achieve a 360 degree ablation.

Figure 6A:
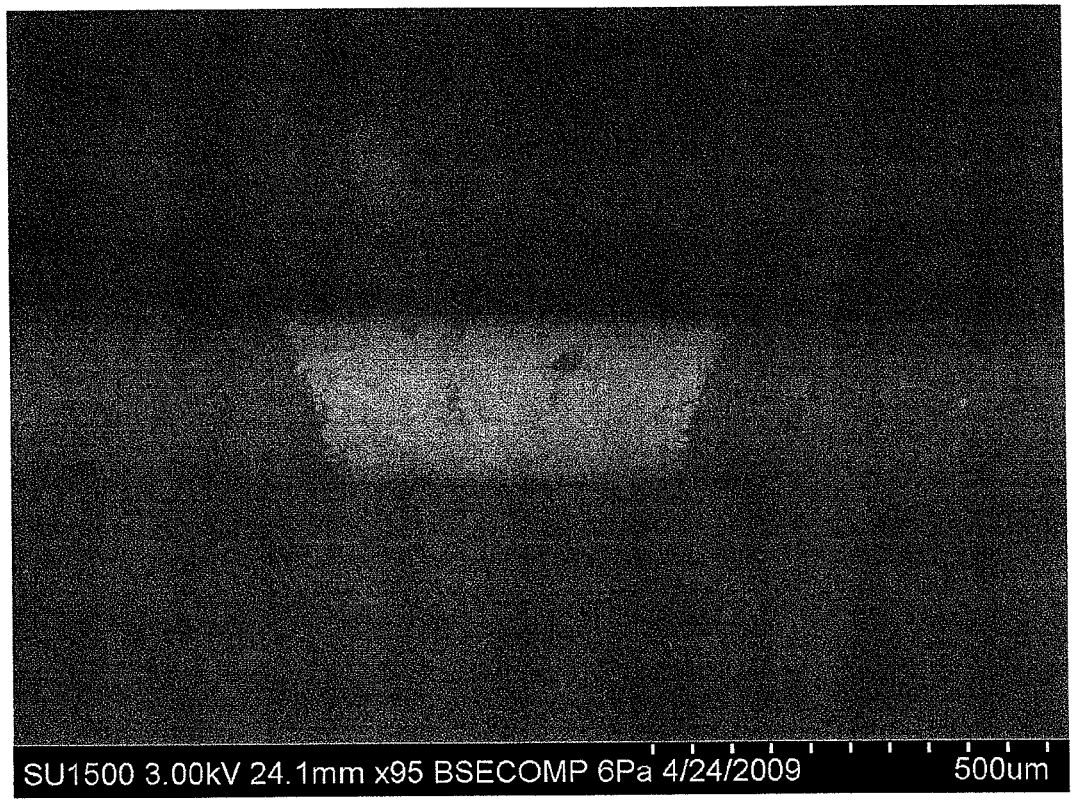
FIGS. 6A and 6B illustrate results of window stripping a fiber using one or more exemplary embodiments.
Figure 6B:
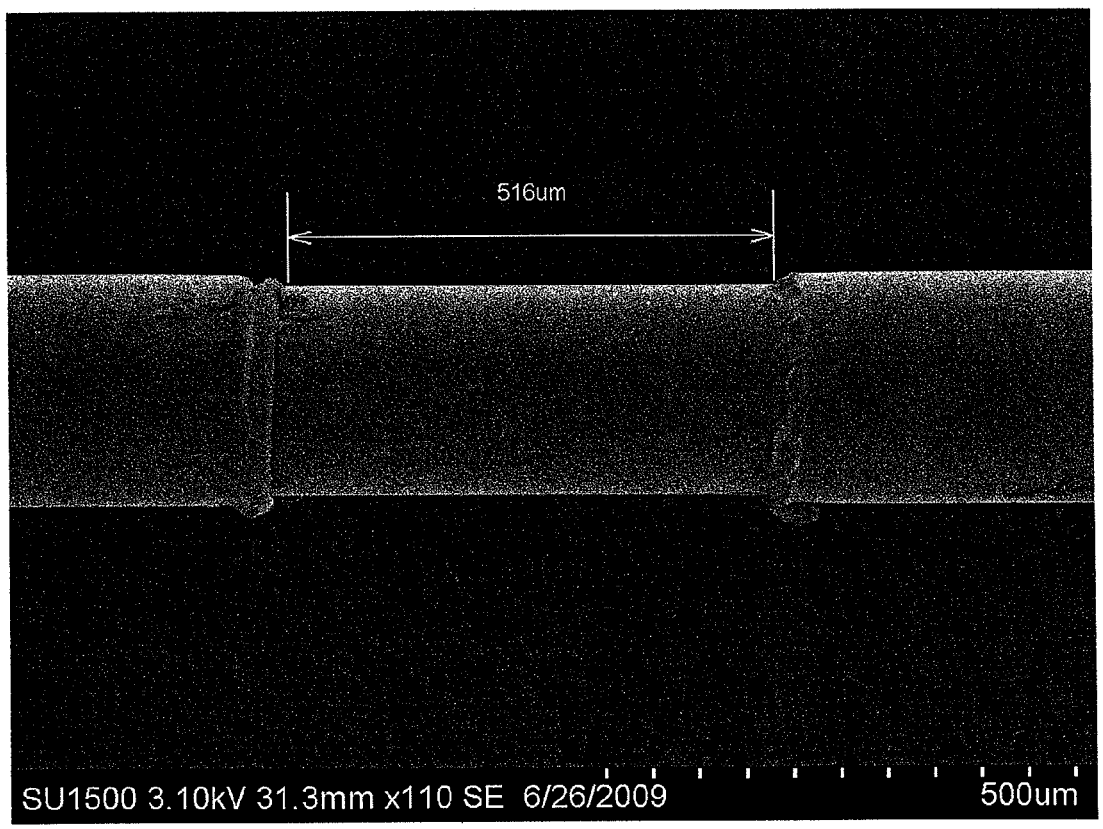

FIG. 6A shows a result of the window stripping process performed on an acrylate coated optical fiber. FIG. 6B shows a result of the window stripping process performed on a polyimide coated optical fiber. The window strip length was found to be approximately 516 µm in FIG. 6B.

Figure 7:
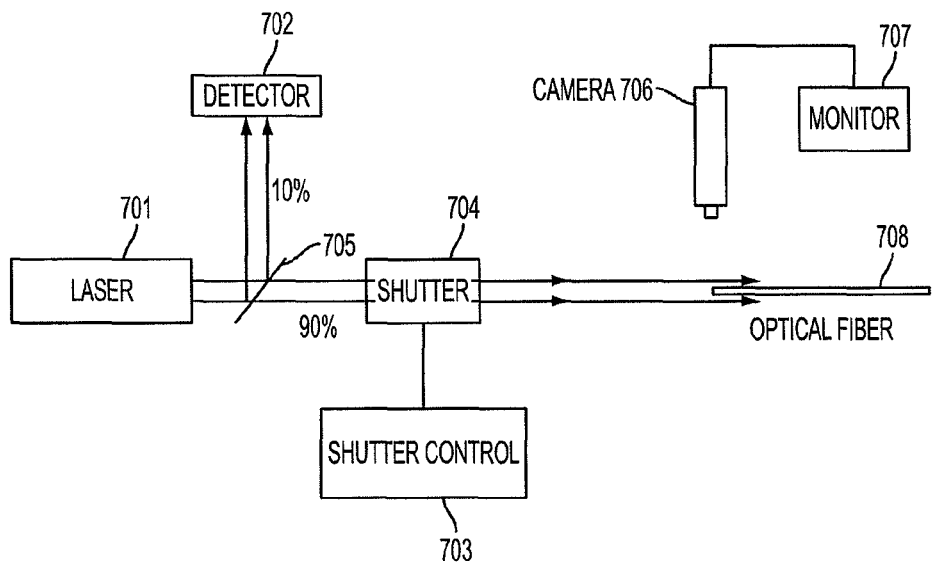
FIG. 7 illustrates an exemplary embodiment for chamfering a cleaved optical fiber.

Once the fiber is cleaved, it has to chamfered. FIG. 7 is an exemplary embodiment of a system for chamfering a cleaved optical fiber. This system can also be used to create a Ball lens on the fiber tip, for which the fiber would need to be rotated along its axis. The system of FIG. 7 is similar to the system of FIG. 5 in that some of the components such as laser source 701, detector 702, shutter 704, shutter control 703, beam splitter 705, camera 706, and monitor 707 have similar functionality as their counterpart devices in FIG. 5. Therefore, description of these devices will be omitted in the interest of conciseness. The cleaved optical fiber 708 is exposed to the laser source transmitted through the shutter 704 to chamfer its end face, which resulted from the cleaving process.

Figure 8:
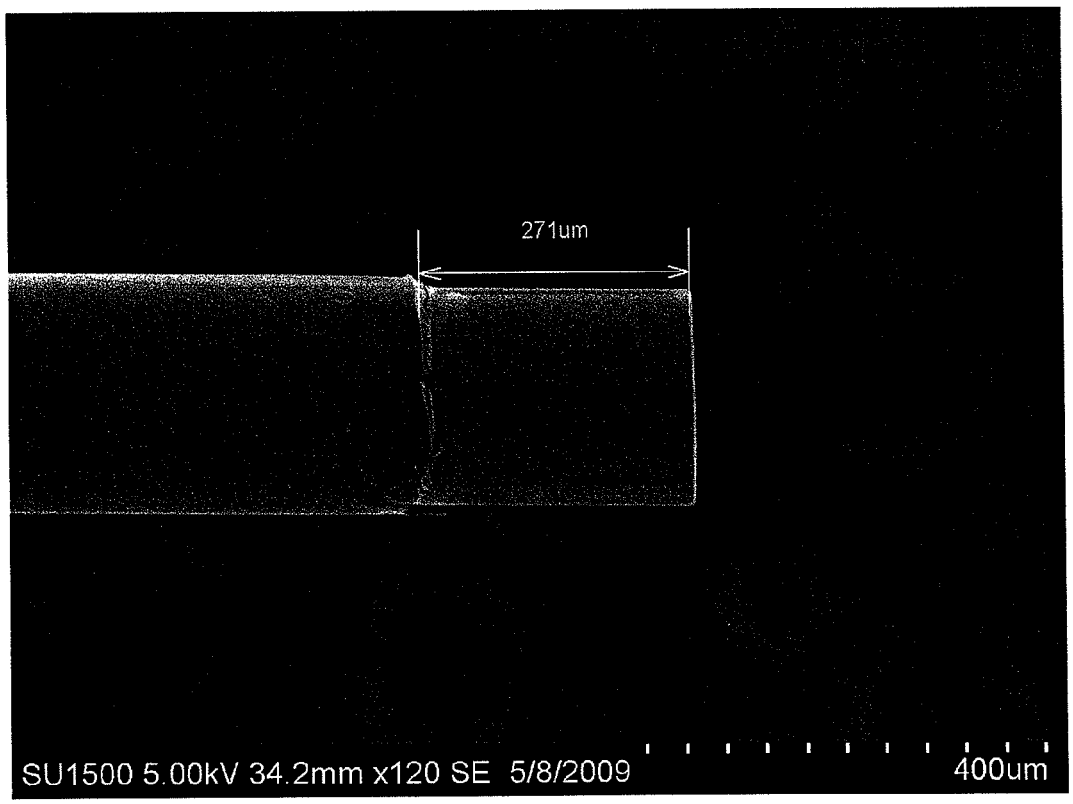
FIG. 8 illustrates a final result of the cleaving and chamfering process.

A final result of the cleaving and chamfering processes is shown in FIG. 8. The result of FIG. 8 was obtained by end face laser exposure using a 125 ms pulse at 40 Watts. The chamfer diameter was found to be 18.3 μm. The chamfer diameter can be optimized by varying the laser power and the pulse width. The optical fiber obtained has an end face strip back (coating strip back) of only 271 μm. As the coating strip back is very small, the mechanical damage to the optical fiber is minimal in its field use.

In the above discussed exemplary embodiments, the optical components, i.e., the lens and mirror may be optimized for operation in the IR and UV region of the electro magnetic spectrum. Furthermore, the laser source is not limited to a $CO_2$ laser and may include a UV-Excimer laser.

The above exemplary embodiments have been discussed with respect to a single optical fiber. However, it will be apparent to one of ordinary skill in the art that the novel aspects disclosed herein could be easily applied to a bundle of optical fibers.

The description of the exemplary embodiments has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The invention claimed is:

1. A process of cleaving an optical fiber, the process comprising:
   window stripping the optical fiber using a laser source to create a window strip;
   scribing the window stripped optical fiber at a position within the window strip; and
   applying tension to the optical fiber,
   wherein the window stripping comprises:
      focusing a laser beam output by the laser source through focusing optics;
      placing the optical fiber in the path of the laser beam away from the focal point of the focusing optics; and
      exposing the optical fiber to the laser source for a predetermined exposure time, thereby creating the window strip,
   wherein the cleaved optical fiber obtained as a result of the scribing and applying the tension has an end face strip back smaller than 300 microns.

2. The process of claim 1, wherein the optical fiber is under tension while the window stripped optical fiber is scribed.

3. The process of claim 1, wherein the optical fiber is coated with one of polyimide and acrylate, and the window stripping results in the removal of a portion of the optical fiber coating.

4. A process of cleaving an optical fiber, the process comprising:
   window stripping the optical fiber using a laser source to create a window strip;
   scribing the window stripped optical fiber at a position within the window strip; and
   applying tension to the optical fiber,
   wherein the window stripping comprises:
      focusing a laser beam output by the laser source through focusing optics;
      placing the optical fiber in the path of the laser beam away from the focal point of the focusing optics; and
      exposing the optical fiber to the laser source for a predetermined exposure time, thereby creating the window strip,
   wherein a total time for which the optical fiber is exposed to the focused laser beam is less than 250 ms and an optical power of the laser beam is less than 5 Watts.

5. A process of chamfering an optical fiber, the process comprising:
   window stripping the optical fiber using a laser source to create a window strip;
   applying tension to the optical fiber and scribing the window stripped optical fiber at a position within the window strip to cleave the optical fiber; and
   chamfering an end face of the cleaved optical fiber by applying heat to the end face,
   wherein a portion of the end face is flat,
   wherein the cleaved optical fiber obtained as a result of the scribing and applying the tension has an end face strip back smaller than 300 microns.

6. The process of claim 5, wherein the optical fiber is under tension while the window stripped optical fiber is scribed.

7. The process of claim 5, wherein the window stripping comprises:
   focusing a laser beam output by the laser source through focusing optics; and
   placing the optical fiber in the path of the laser beam away from the focal point of the focusing optics.

8. The process of claim 5, wherein the optical fiber is coated with one of polyimide and acrylate, and the window stripping results in the removal of a portion of the optical fiber coating.

9. The process of claim 5, wherein the end face of the cleaved optical fiber is chamfered by applying heat from one of $CO_2$ laser, a plasma arc, a gas flame, and a resistive coil.

10. A process of chamfering an optical fiber, the process comprising:
   window stripping the optical fiber using a laser source to create a window strip;
   applying tension to the optical fiber and scribing the window stripped optical fiber at a position within the window strip to cleave the optical fiber; and
   chamfering an end face of the cleaved optical fiber by applying heat to the end face,
   focusing a laser beam output by the laser source through focusing optics; and
   placing the optical fiber in the path of the laser beam away from the focal point of the focusing optics,
   wherein a total time for which the optical fiber is exposed to the focused laser beam is less than 250 ms and an optical power of the laser beam is less than 5 Watts.

11. An apparatus for cleaving and chamfering an optical fiber, the apparatus comprising:
- a laser source for window stripping the optical fiber to create a window strip; and
- a mechanical cleaver for scribing the window stripped optical fiber at a position within the window strip and applying tension to the optical fiber to cleave the optical fiber; and
- a heat source comprising one of a laser, a plasma arc, a gas flame, and a resistive coil for chamfering an end face of the cleaved optical fiber,
- wherein the heat source is configured to focus energy on an end face of the cleaved optical fiber thereby chamfering the end face,
- wherein the cleaved optical fiber obtained as a result of the scribing and applying the tension has an end face strip back smaller than 300 microns.

12. The apparatus of claim 11, wherein the optical fiber is under tension when the window stripped optical fiber is scribed.

13. The apparatus of claim 11, further comprising:
- focusing optics for focusing a laser beam output by the laser source on the optical fiber,
- wherein the optical fiber is placed in the path of the laser beam away from the focal point of the focusing optics.

14. The apparatus of claim 13, wherein the focusing optics comprises:
- a lens for focusing the laser beam output by the laser source; and a shutter device for blocking and unblocking transmission of the laser beam from the laser source to the lens.

15. The apparatus of claim 11, wherein the heat source is a $CO_2$ laser.

16. An apparatus for cleaving and chamfering an optical fiber, the apparatus comprising:
- a laser source for window stripping the optical fiber to create a window strip; and
- a mechanical cleaver for scribing the window stripped optical fiber at a position within the window strip and applying tension to the optical fiber to cleave the optical fiber; and
- a heat source comprising one of a laser, a plasma arc, a gas flame, and a resistive coil for chamfering an end face of the cleaved optical fiber,
- wherein the heat source is configured to focus energy on an end face of the cleaved optical fiber thereby chamfering the end face,
- wherein a total time for which the optical fiber is exposed to the focused laser beam is less than 250 ms and an optical power of the laser beam is less than 5 Watts.

* * * * *